(12) United States Patent
Chang et al.

(10) Patent No.: US 9,041,558 B1
(45) Date of Patent: May 26, 2015

(54) PARKING SENSOR DEVICE

(71) Applicant: Tung Thih Electronic Co., Ltd., Luchu Township, Taoyuan County (TW)

(72) Inventors: Chiun-Hua Chang, Luchu Township, Taoyuan County (TW); Yih-Jyh Lin, Luchu Township, Taoyuan County (TW)

(73) Assignee: Tung Thih Electronic Co., Ltd., Luchu Township, Taoyuan County (TW)

( * ) Notice: Subject to any disclaimer, the term of this patent is extended or adjusted under 35 U.S.C. 154(b) by 15 days.

(21) Appl. No.: 14/073,072

(22) Filed: Nov. 6, 2013

(51) Int. Cl.
*G08G 1/04* (2006.01)
*G08G 1/01* (2006.01)

(52) U.S. Cl.
CPC ... *G08G 1/04* (2013.01); *G08G 1/01* (2013.01)

(58) Field of Classification Search
CPC ....... H01L 41/053; B06B 1/0644; G08G 1/04
USPC .......... 340/943, 942; 310/322, 334, 335, 348; 73/152.58, 632, 861.18
See application file for complete search history.

(56) References Cited

U.S. PATENT DOCUMENTS 7,548,014 B2 * 6/2009 Asada et al. .................. 310/348
7,795,785 B2 * 9/2010 Hayashi et al. ............... 310/334

* cited by examiner

*Primary Examiner* — Tai T Nguyen
(74) *Attorney, Agent, or Firm* — C. G. Mersereau; Nikolai & Mersereau, P.A.

(57) ABSTRACT

A parking sensor device has a casing, a front cover, a sensor module and an assembling clamp. The casing has two first hooking elements. The front cover is mounted on the casing. The sensor module is mounted in the casing and the front cover. The assembling clamp detachably engages the casing and has two second hooking elements. The second hooking elements selectively hook the first hooking elements of the casing respectively. The casing and the assembling clamp are engaged quickly with each other, thereby facilitating the easy fabrication of the parking sensor device and improving the convenience of maintenance of the parking sensor device.

6 Claims, 8 Drawing Sheets

PARKING SENSOR DEVICE

BACKGROUND OF THE INVENTION

1. Field of the Invention

The present invention relates to a sensor device, and more particularly to a parking sensor device that can be fabricated quickly and has desirable structural strength.

2. Description of Related Art

Parking sensor devices are widely equipped in vehicles. A conventional parking sensor device is usually mounted on a bumper of a vehicle for detecting any barriers around the vehicle, which decreases visual dead spaces of which a vehicle driver cannot be aware.

A conventional way for fabricating a parking sensor device is complicated. Furthermore, the whole structural strength of the fabricated parking sensor device is undesirable. When a caring equipped with the parking sensor device is moving, the parking sensor device easily to disassemble accidentally.

To overcome the shortcomings, the present invention provides a parking sensor device to mitigate or obviate the aforementioned problems.

SUMMARY OF THE INVENTION

The main objective of the invention is to provide a parking sensor device that can be fabricated quickly and has desirable structural strength.

A parking sensor device in accordance with the present invention can be mounted on a bumper of a vehicle and has a casing, a front cover, a sensor module and an assembling clamp. The casing has two first hooking elements. The front cover is mounted on the casing. The sensor module is mounted in the casing and the front cover. The assembling clamp detachably engages the casing and has two second hooking elements. The second hooking elements selectively hook the first hooking elements of the casing respectively. The casing and the assembling clamp are engaged quickly with each other, thereby facilitating the easy fabrication of the parking sensor device and improving the convenience of maintenance of the parking sensor device.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
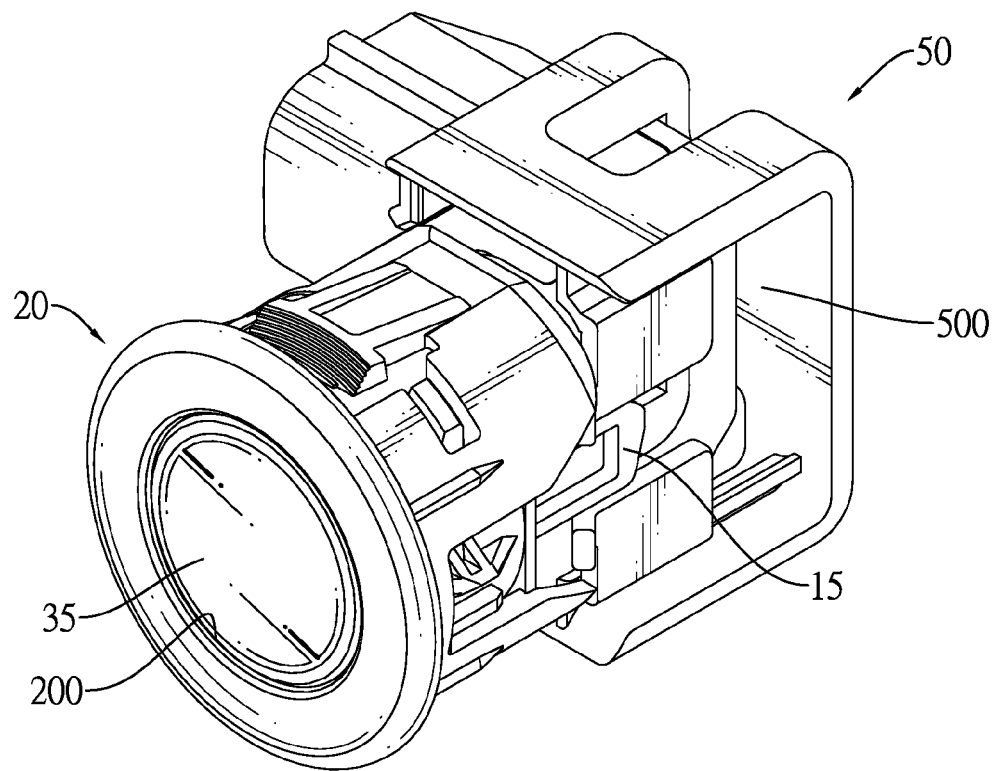
FIG. 1 is a perspective view of a parking sensor device in accordance with the present invention.
Figure 2:
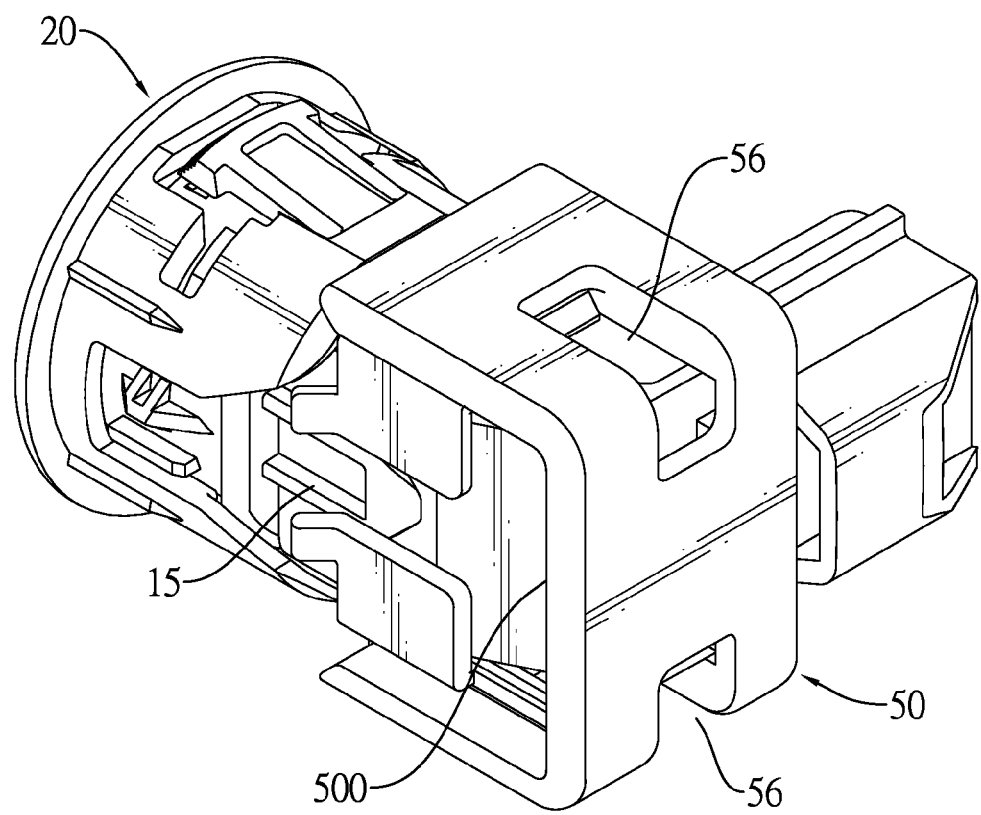
FIG. 2 is another perspective view of the parking sensor in FIG. 1.
Figure 3:
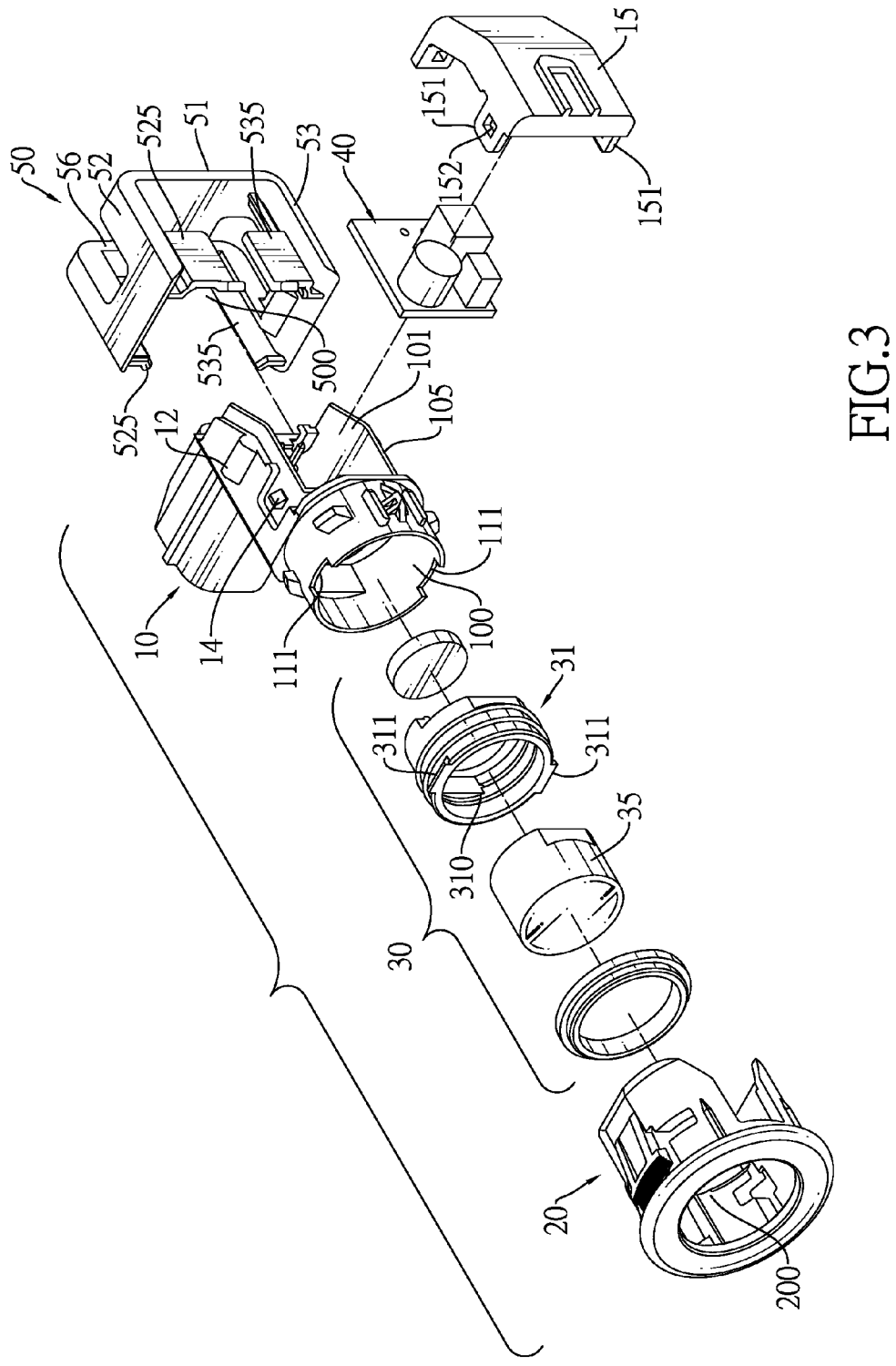
FIG. 3 is an exploded perspective view of the parking sensor in FIG. 1.

With reference to FIGS. 1 to 3 and 9, a parking sensor device in accordance with the present invention may be mounted on a bumper of a vehicle and comprises a casing 10, a front cover 20, a sensor module 30, a circuit board 40, an assembling clamp 50 and a cable assembly 60.

The casing 10 has a top, a bottom, a front, a rear, a sleeve 11, a cavity 100, two first hooking elements 12, 13, a chamber 101, an opening 105, multiple fastening elements 14 and a cap 15.

The sleeve 11 is formed on the front of the casing 10 and has multiple positioning recesses 111 defined in a front end of the sleeve 11.

The cavity 100 is defined in and surrounded by the sleeve 11 of the casing 10.

The first hooking elements 12, 13 are formed respectively on the top and the bottom of the casing 10.

The chamber 101 is defined in the casing 10.

The opening 105 is defined through the casing 10 close to the rear and communicates with the chamber 101.

The fastening elements 14 are formed on and protrude from the casing 10.

The cap 15 is mounted detachably on the opening 105 so that the opening 105 may be covered by the cap 15. The cap 15 has multiple fastening tabs 151 formed on and protruding from the cap 15 and corresponding to the fastening elements 14. Each fastening tab 151 has a fastening hole 152 defined through the fastening tab 151 and engaging a corresponding fastening element 14.

The front cover 20 is mounted on the front of the casing 10 and has a through hole 200 defined through the front cover 20.

The sensor module 30 is mounted in the cavity 100 of the casing 10 and the through hole 200 of the front cover 20. The sensor module 30 may be an ultrasonic sensor module and may have a mounting bracket 31 and an ultrasonic transducer 35.

The mounting bracket 31 is mounted in the sleeve 11 of the casing 10 and has an inner space 310 and multiple positioning protrusions 311. The inner space 310 is defined in the mounting bracket 31. The multiple positioning protrusions 311 are formed on and protrude radially from the mounting bracket 31 and respectively engaging the positioning recesses 111 of the casing 10.

The ultrasonic transducer 35 is mounted in the inner space 31 of the mounting bracket 31.

The circuit board 40 is mounted in the chamber 101 of the casing 10 and is connected electrically to the sensor module 30. The circuit board 40 may have electric components such as a central process unit and a random access memory to process signals from the sensor module 30.

Figure 4:
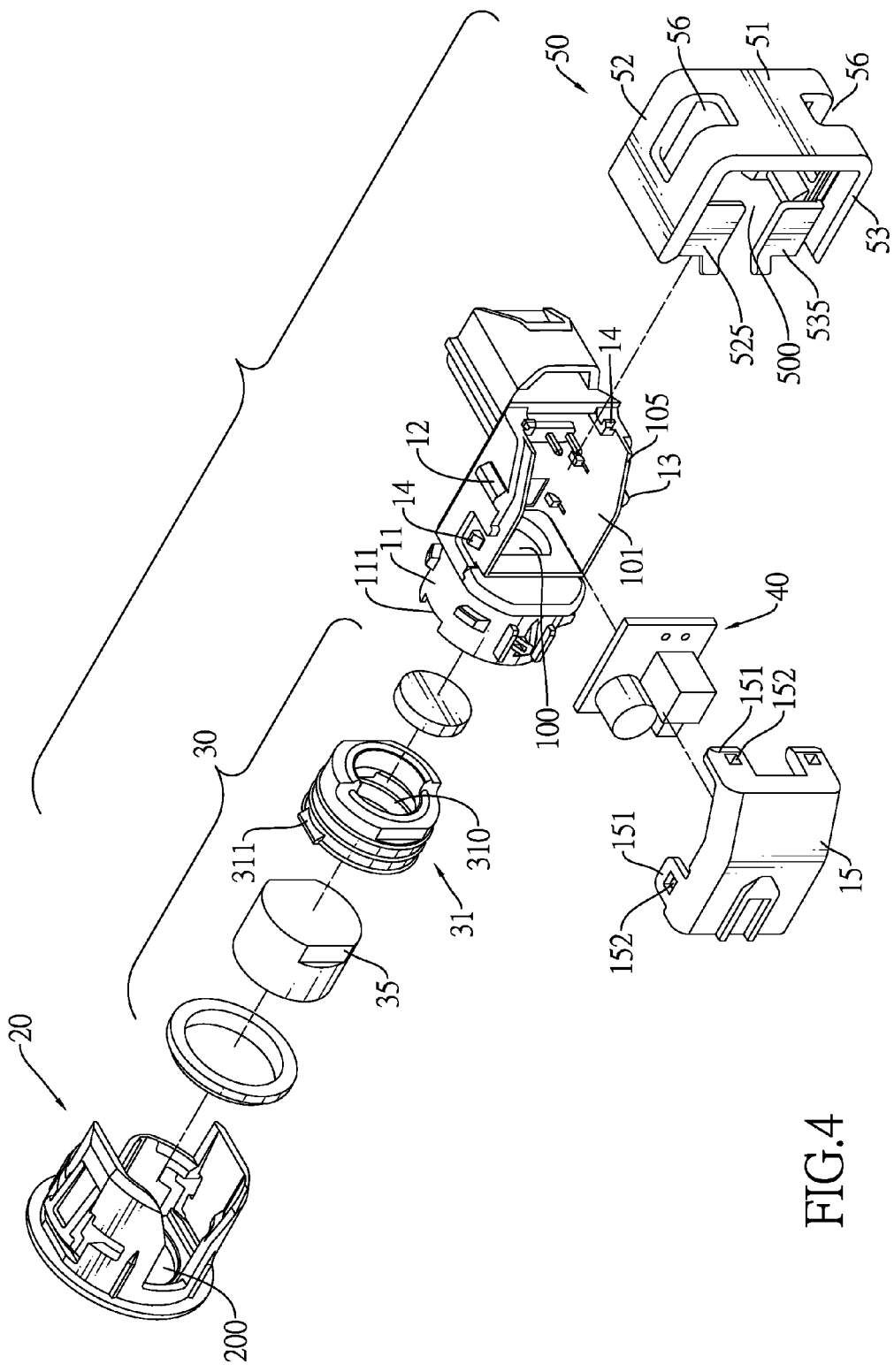
FIG. 4 is another exploded perspective view of the parking sensor in FIG. 1.
Figure 5:
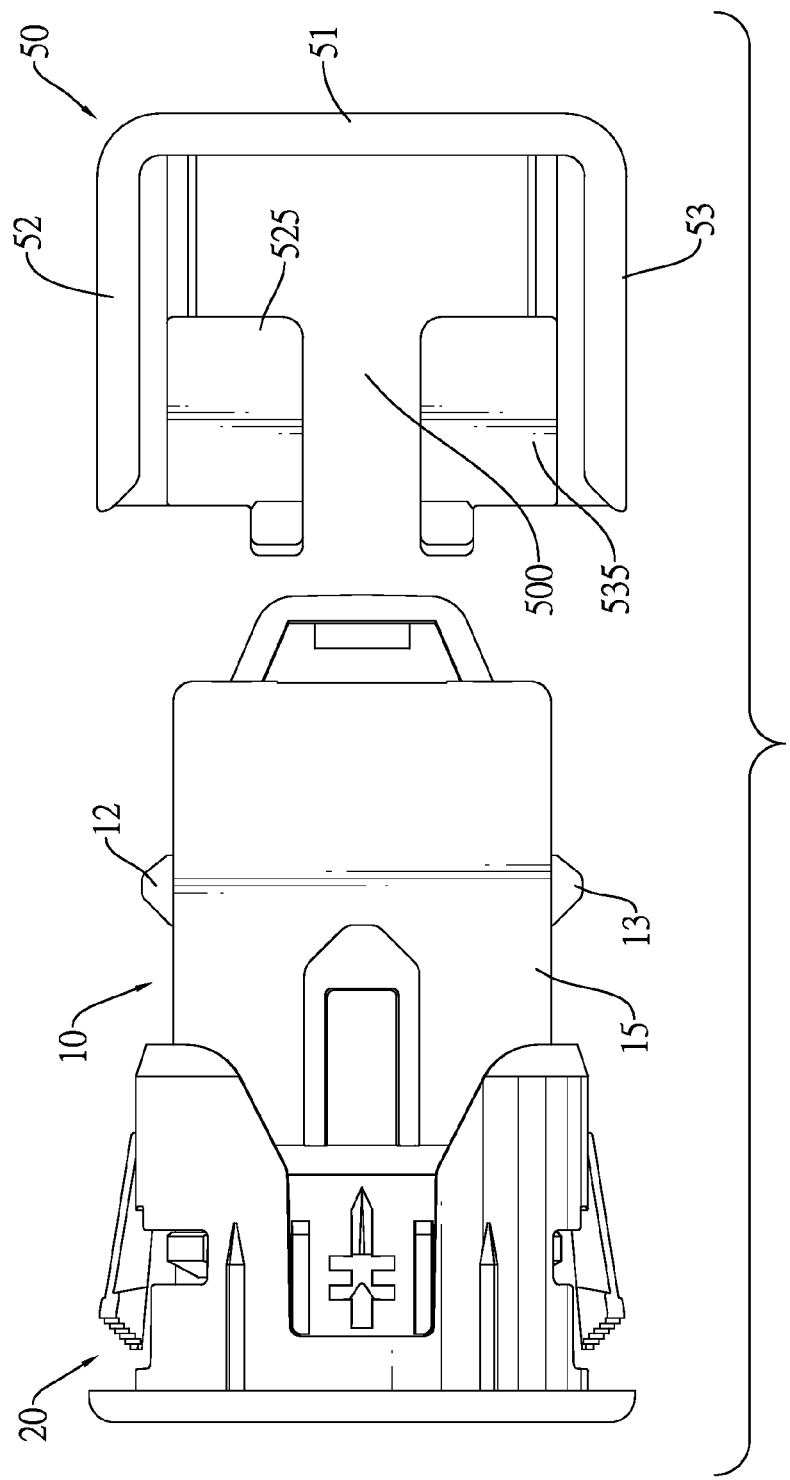
FIG. 5 is a partially exploded side view of the parking sensor device in FIG. 1.
Figure 6:
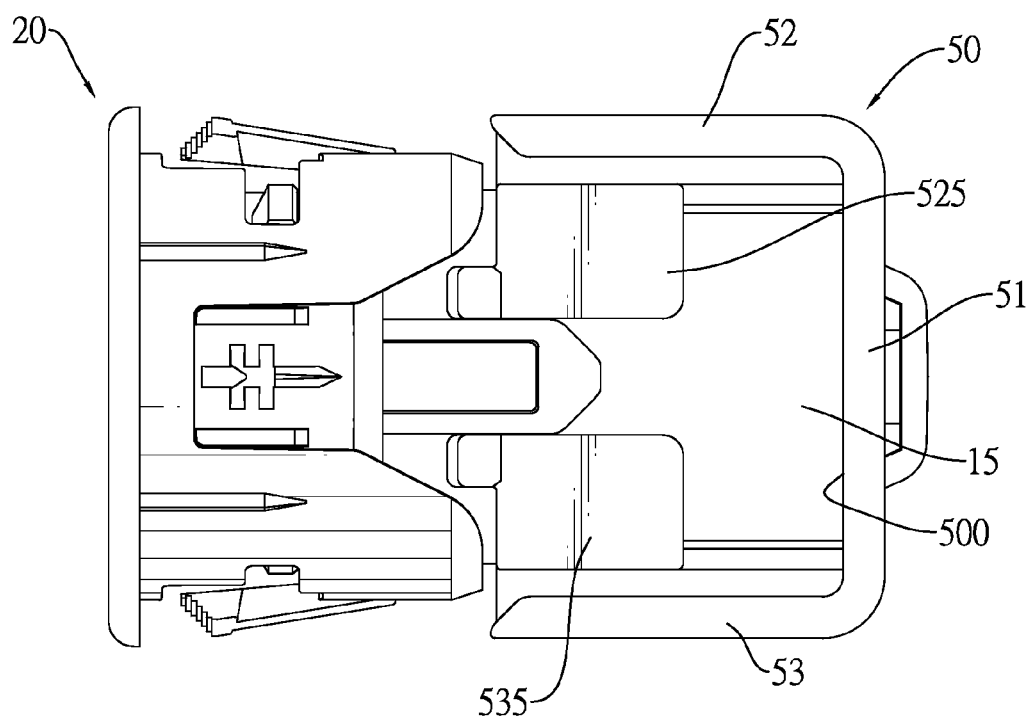
FIG. 6 is a side view of the parking sensor in FIG. 6.
Figure 7:
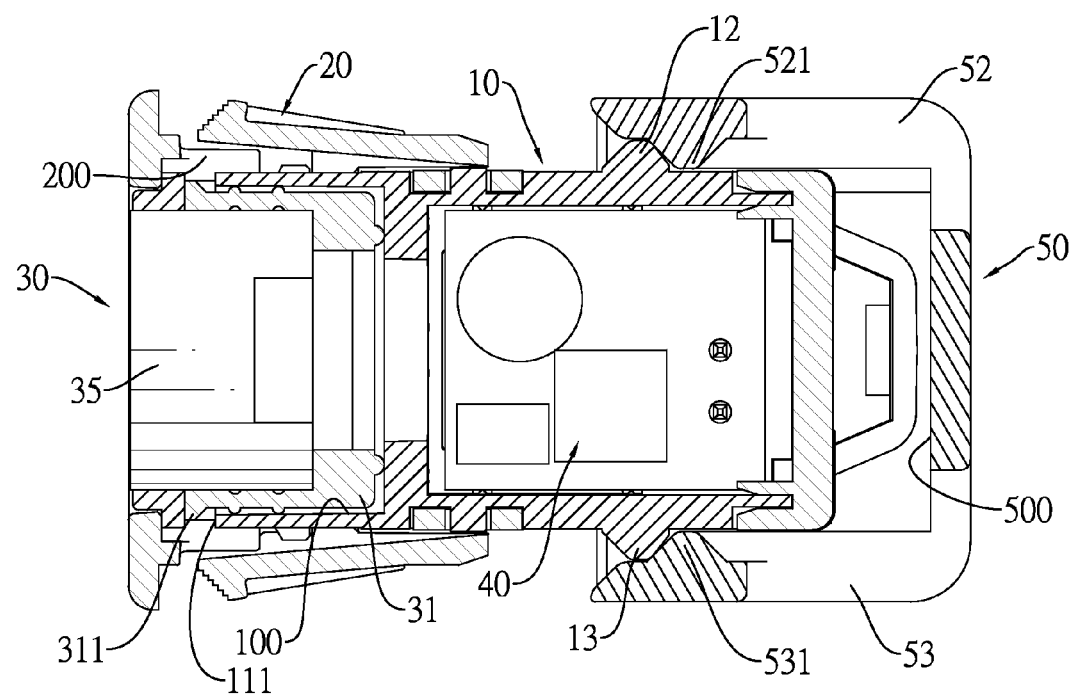
FIG. 7 is an operational cross sectional side view of the parking sensor device in FIG. 1 showing that a casing is halfway engaging a assembling clamp.
Figure 8:
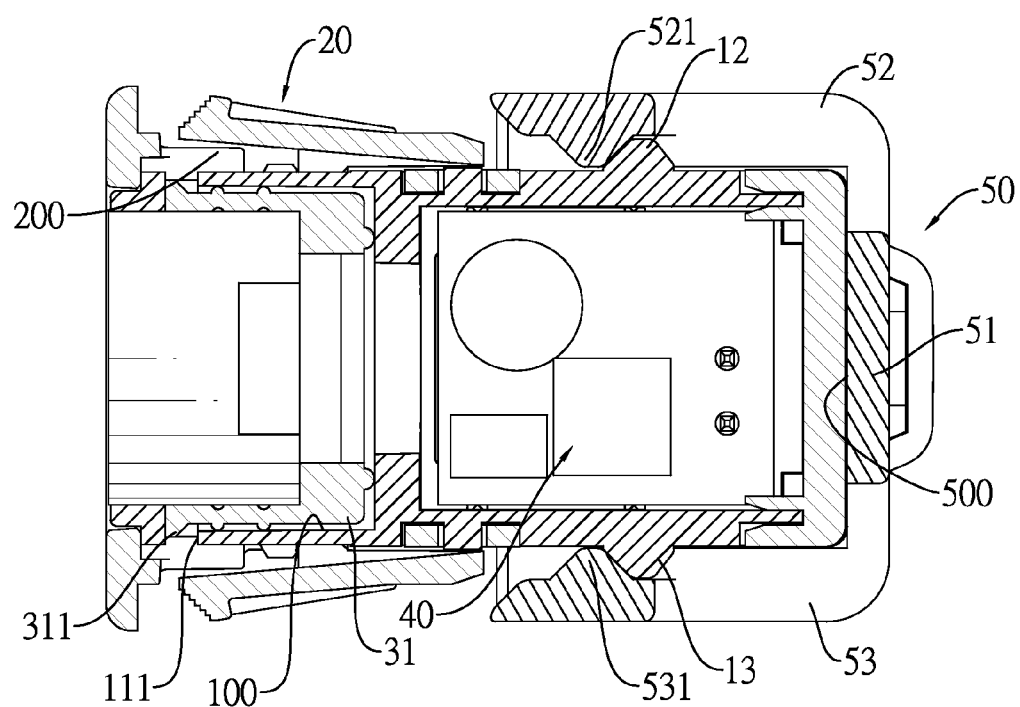
FIG. 8 is an operational cross sectional side view of the parking sensor device in FIG. 7 showing that the casing engages the assembling clamp completely.

With further reference to FIG. 4, the assembling clamp 50 detachably engages the rear of the casing 10 and has a mounting space 500 and may further have a base board 51, two extension boards 52, 53 and two slots 56.

The mounting space 500 is defined in the assembling clamp 50, detachably engages the rear of the casing 10, and has an inner surface and two second hooking elements 521, 531. The second hooking elements 521, 531 are formed on the inner surface of the mounting space 500, are opposite to each other, and selectively hook the first hooking elements 12, 13 of the casing 10 respectively. When the casing 10 enters the mounting space 500 of the assembling clamp 50, the first hooking elements 12, 13 move across and respectively hook the second hooking elements 521, 531 to prevent the casing 10 from falling out of the assembling clamp 50.

The extension boards 52, 53 are formed oppositely on and protrude respectively from two ends of the base board 51. The mounting space 500 is defined among the base board 51 and the extension boards 52, 53. The second hooking elements 521, 531 are formed respectively on the extension boards 52, 53. Furthermore, each extension board 52, 53 may further have two limiting guides 525, 535 formed on the extension board 52, 53. When the casing 10 enters the mounting space 500 of the assembling clamp 50, the casing 10 is limited to move between the two limiting guides 525, 535 of each extension board 52, 53 without laterally falling out of the assembling clamp 50.

Each slot 56 is defined through the base board 51 and one of the extension boards 52, 53 of the assembling clamp 50 to make the extension boards 52, 53 of the assembling clamp 50 light-weighted and slightly resilient for deformation, thereby facilitating hooking the first hooking elements 12, 13 to the second hooking elements 521, 531.

The casing 10 and the assembling clamp 50 are engaged quickly with each other through the first hooking elements 12, 13 and the second hooking elements 521, 531, thereby facilitating the easy fabrication of the parking sensor device and improving the convenience of maintenance of the parking sensor device. Furthermore, the assembling clamp 50 covers the casing 10 and the cap 15 to improve the combination strength of the casing 10 and the cap 15 so increasing the whole structural strength of the parking sensor device.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A parking sensor device comprising:
   a casing having a top, a bottom, a front and a rear and further having
      a cavity defined in the casing;
      a chamber defined in the casing;
      an opening defined through the casing close to the rear and communicating with the chamber;
      two first hooking elements formed respectively on the top and the bottom; and
      a cap mounted detachably on the opening;
   a front cover mounted on the front of the casing and having
      a through hole defined through the front cover;
   a sensor module mounted in the cavity of the casing and the through hole of the front cover; and
   an assembling clamp detachably engaging the rear of the casing and having
      a mounting space defined in the assembling clamp, detachably engaging the rear of the casing and having an inner surface; and
         two second hooking elements formed on the inner surface of the mounting space, being opposite to each other, and selectively hooking the first hooking elements of the casing respectively;
   wherein when the casing enters the mounting space of the assembling clamp, the first hooking elements move across and respectively hook the second hooking elements to prevent the casing from falling out of the assembling clamp.

2. The parking sensor device as claimed in claim 1, wherein
   the assembling clamp further has a base board and two extension boards formed oppositely on and protruding respectively from two ends of the base board;
   the mounting space is defined among the base board and the extension boards; and
   the second hooking elements are formed respectively on the extension boards.

3. The parking sensor device as claimed in claim 2, wherein a circuit board is mounted in the chamber of the casing and is connected electrically to the sensor module.

4. The parking sensor device as claimed in claim 3, wherein the sensor module is an ultrasonic sensor module and has an ultrasonic transducer.

5. The parking sensor device as claimed in claim 4, wherein
   the casing further has multiple fastening elements formed on and protruding from the casing; and
   the cap has multiple fastening tabs formed on and protruding from the cap and corresponding to the fastening elements, and each fastening tab has a fastening hole defined through the fastening tab and engaging a corresponding fastening element.

6. The parking sensor device as claimed in claim 5, wherein
   a sleeve is formed on the front of the casing, surrounds the cavity and has multiple positioning recesses defined in a front end of the sleeve; and
   the sensor module further has a mounting bracket mounted in the sleeve of the casing and having
      an inner space defined in the mounting bracket and accommodating the ultrasonic transducer; and
      multiple positioning protrusions formed on and protruding radially from the mounting bracket and respectively engaging the positioning recesses of the casing.

* * * * *